US012010498B2

(12) United States Patent
Uesugi et al.

(10) Patent No.: US 12,010,498 B2
(45) Date of Patent: Jun. 11, 2024

(54) SPEAKER

(71) Applicant: ALPS ALPINE CO., LTD., Tokyo (JP)

(72) Inventors: Haruki Uesugi, Fukushima (JP); Kei Tanabe, Tokyo (JP); Yusuke Yoshida, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 144 days.

(21) Appl. No.: 17/859,265

(22) Filed: Jul. 7, 2022

(65) Prior Publication Data

US 2023/0037430 A1 Feb. 9, 2023

(30) Foreign Application Priority Data

Aug. 6, 2021 (JP) ................................ 2021-130057

(51) Int. Cl.

| | |
|---|---|
| ***H04R 9/02*** | (2006.01) |
| ***H04R 1/28*** | (2006.01) |
| ***H04R 9/04*** | (2006.01) |
| ***H04R 9/06*** | (2006.01) |

(52) U.S. Cl.

CPC ............ *H04R 9/025* (2013.01); *H04R 1/288* (2013.01); *H04R 9/047* (2013.01); *H04R 9/06* (2013.01); *H04R 2209/027* (2013.01); *H04R 2400/07* (2013.01); *H04R 2400/11* (2013.01)

(58) Field of Classification Search

CPC ........ H04R 9/025; H04R 1/288; H04R 9/047; H04R 9/06; H04R 2209/027; H04R 2400/07; H04R 2400/11

See application file for complete search history.

(56) References Cited

U.S. PATENT DOCUMENTS

2007/0064971 A1* 3/2007 Kudo .................... H04R 9/043 381/396

FOREIGN PATENT DOCUMENTS

| | | |
|---|---|---|
| JP | H09215090 A | 8/1997 |
| JP | 2016-208250 A | 12/2016 |

OTHER PUBLICATIONS

Extended European Search Report for European Patent Application No. 22186604.9 dated Jan. 5, 2023, 17 pages.

* cited by examiner

*Primary Examiner* — Sunita Joshi
(74) *Attorney, Agent, or Firm* — Crowell & Moring LLP

(57) ABSTRACT

An outer structure of a magnetic circuit is held inside a holder recess of a magnetic circuit holder of a frame. A pressing portion is screw-fixed to a mounting surface of the magnetic circuit holder. Elastically deformable pressing arms are formed at the pressing portion, and the pressing arms press a restriction surface of the outer structure of the magnetic circuit.

19 Claims, 7 Drawing Sheets

SPEAKER

BACKGROUND

Related Application

The present application claims priority to Japanese Patent Application Number 2021-130057, filed on Aug. 6, 2021, the entirety of which is hereby incorporated by reference.

Field

The present disclosure relates to a speaker having a structure that enables a frame to stably hold a magnetic circuit, and that prevents the frame holding the magnetic circuit from readily deforming.

DESCRIPTION OF THE RELATED ART

JP 9-215090 A describes a speaker having a bottom chamber and a frame. The bottom chamber holds a magnetic circuit, and the frame supports a diaphragm and a damper. The magnetic circuit is formed of a magnet disposed as an inner portion of the magnetic circuit and a yoke disposed as an outer portion thereof. Front and rear magnetic gaps are formed between the outer peripheral surface of the magnet and the inner peripheral surface of the yoke. A coil bobbin is fixed to the diaphragm, and two voice coils are wound around the coil bobbin. The voice coils are positioned inside the respective front and rear magnetic gaps.

The frame has a bottom portion that is fixed to the front end surface of the bottom chamber using mounting screws. The inner diameter of the bottom portion of the frame is set to be slightly smaller than the outer diameter of the yoke that is held by the bottom chamber. The inner periphery of the bottom portion presses the front end surface of the yoke from in front. The magnet of the magnetic circuit is fixed to the bottom chamber due to the magnetic attraction, whereas the yoke of the magnetic circuit is restricted from moving in the thrust direction in the bottom chamber due to the front end surface of the yoke being pressed by the inner periphery of the bottom portion of the frame.

According to the speaker described in JP 9-215090 A, it is difficult to align the front end surface of the yoke with the front end surface of the bottom chamber to which the bottom portion of the frame is fixed because of deviation within the dimensional tolerances of the bottom chamber and the frame. Accordingly, a step (a difference in level) is inevitably produced between the front end surface of the bottom chamber and the front end surface of the yoke.

If the front end surface of the bottom chamber is positioned rearward from the front end surface of the yoke, a gap occurs between the bottom portion of the frame and the front end surface of the bottom chamber because the inner periphery of the bottom portion of the frame is in contact with the front end surface of the yoke. As a result, the frame and the bottom chamber cannot be connected stably by the mounting screws. The tightening force of the mounting screws tends to deform the frame, or may even break the frame. The deformation of the frame may deteriorate the vibration characteristics of the diaphragm that is supported by the frame. If the front end surface of the yoke is positioned rearward from the front end surface of the bottom chamber, the magnetic circuit cannot be stably restricted from moving in the thrust direction, and the magnetic circuit may be displaced due to external vibrations.

SUMMARY

Accordingly, it is an object of the present disclosure to provide a speaker having a structure that enables the frame to stably hold the magnetic circuit, and that does not readily cause a large stress to act on the frame, even if a step is produced between the mounting surface of the frame and the front end surface of the magnetic circuit.

According to an aspect of the present disclosure, a speaker includes a frame, a diaphragm that the frame supports so as to enable the diaphragm to vibrate, a coil that drives the diaphragm to vibrate, and a magnetic circuit that is positioned rearward relative to the diaphragm and applies a magnetic field to the coil. The frame has a magnetic circuit holder in which the magnetic circuit is held, and the magnetic circuit has a restriction surface that faces frontward. The magnetic circuit holder has pressing arms that are disposed so as to be in contact with the restriction surface. Contact portions between respective pressing arms and the restriction surface are disposed with spacing therebetween.

In the speaker, the magnetic circuit holder may be configured such that the magnetic circuit is inserted rearward thereinto and is fixed therein.

In the speaker, the magnetic circuit holder may have a mounting surface that faces frontward, and a pressing portion may have a screw-fixation portion that is screw-fixed to the mounting surface. The pressing arms may be integrally formed with the pressing portion. The pressing arms and the screw-fixation portion may be disposed such that a radial line that extends from a center of the magnetic circuit and on which the screw-fixation portion of the pressing portion is positioned does not overlap radial lines that extend from the center of the magnetic circuit and on which respective pressing arms are positioned.

In the speaker, the pressing portion may be formed separately from the frame.

In the speaker, the pressing portion may be formed integrally with the frame.

In the speaker, a damper support member to which an outer peripheral portion of a damper that supports the diaphragm is fixed may be formed separately from the frame. The pressing portion may be interposed between the mounting surface and the damper support member.

In the speaker, a damper support member to which an outer peripheral portion of a damper that supports the diaphragm is fixed may be formed separately from the frame. The pressing portion may be formed integrally with the damper support member.

In the speaker, the frame may have a diaphragm support member that supports the diaphragm and a magnetic circuit holder member that holds the magnetic circuit. The pressing portion may be formed integrally with the diaphragm support member.

In the speaker, the frame may have a diaphragm support member that supports the diaphragm and a magnetic circuit holder member that holds the magnetic circuit. The pressing portion may be interposed between the mounting surface and the diaphragm support member.

The speaker according to the present disclosure is configured such that the pressing arms press the restriction surface of the magnetic circuit while the magnetic circuit is held by the magnetic circuit holder positioned rearward relative to the frame. This enables the frame to stably hold the magnetic circuit. In addition, the contact portions between respective pressing arms and the restriction surface are disposed with spacing therebetween. This can prevent a large stress from acting on the frame when the pressing arms deform, even if a step is produced between the restriction surface of the magnetic circuit and the mounting surface of the magnetic circuit holder.

DESCRIPTION OF THE PREFERRED EMBODIMENTS

Figure 1:
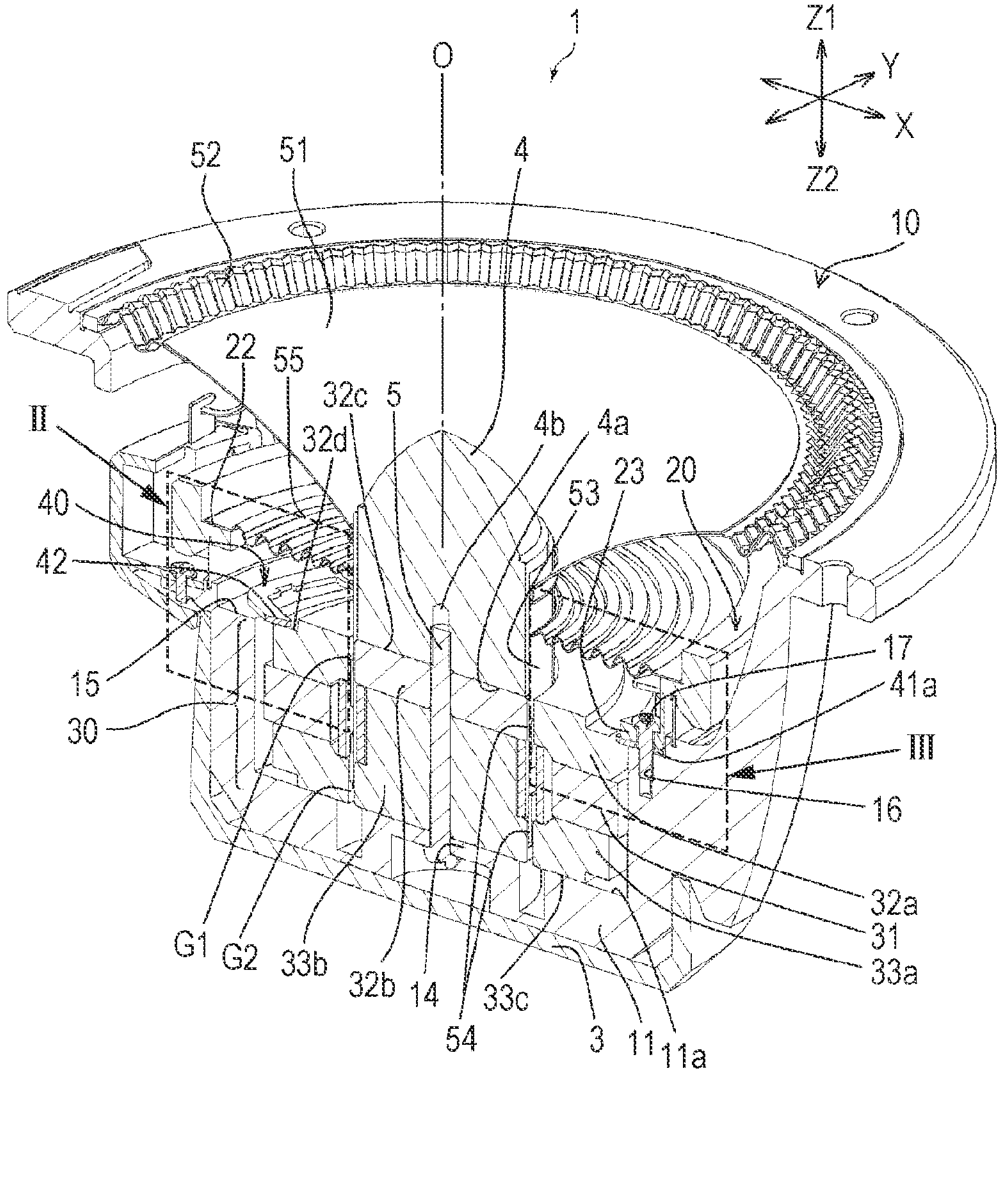
FIG. 1 is a perspective view illustrating a half section of a speaker according to a first embodiment of the present disclosure, the section being cut along the center axis of the speaker.
Figure 2:
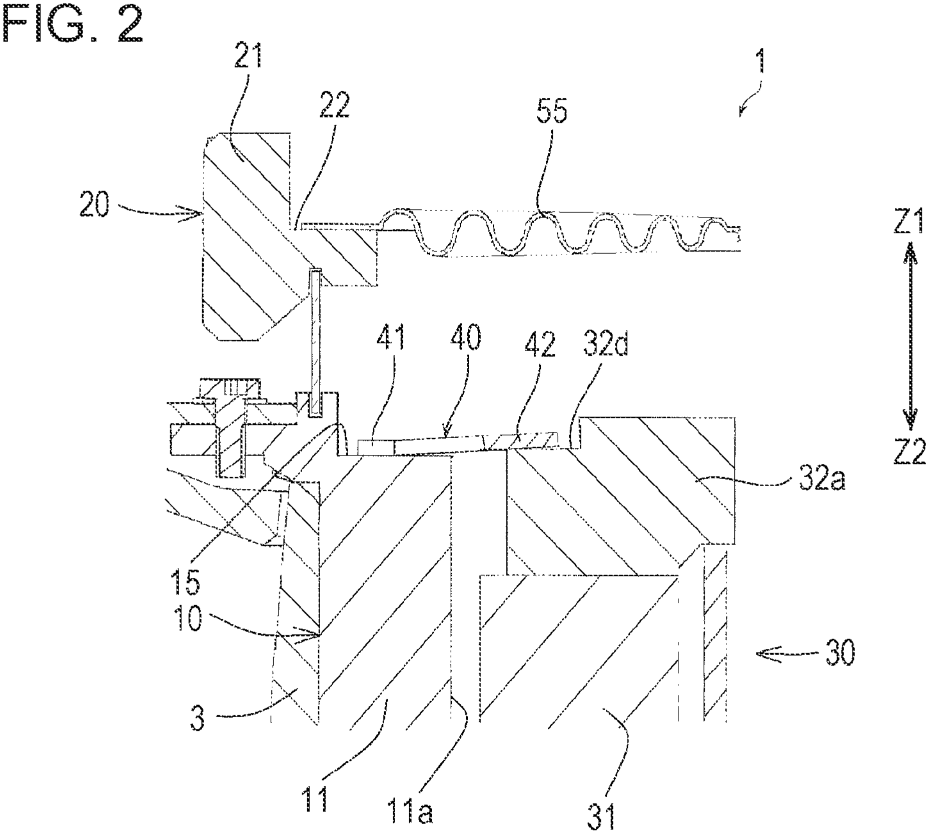
FIG. 2 is a sectional view illustrating region II of the speaker of the first embodiment.
Figure 3:
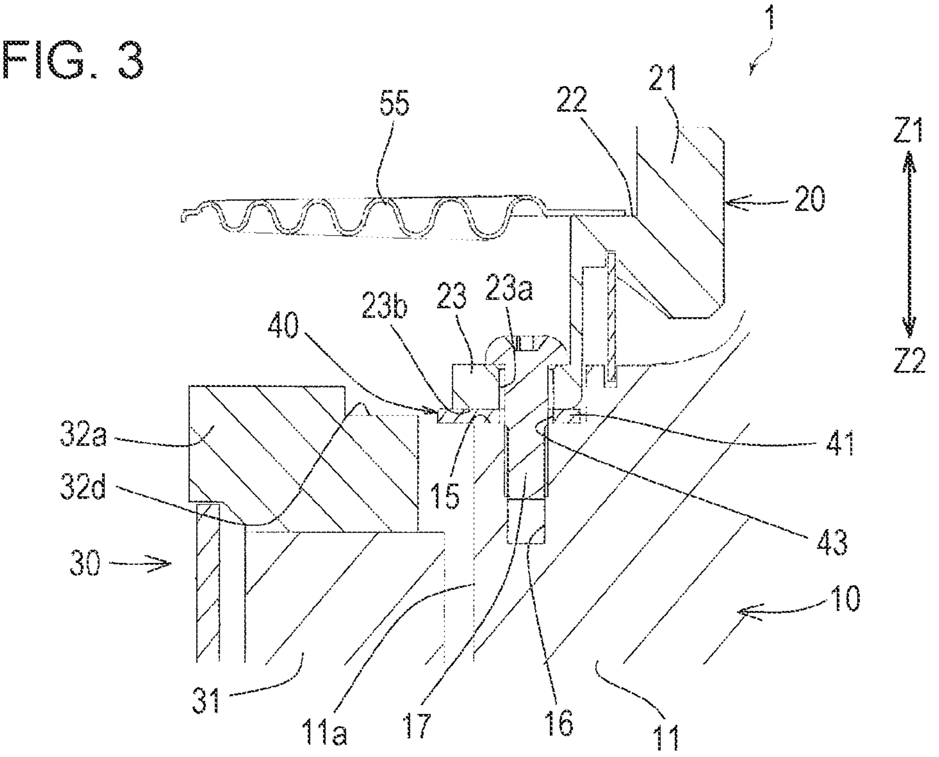
FIG. 3 is a sectional view illustrating region III of the speaker of the first embodiment.

In a speaker 1 according to a first embodiment of the present disclosure, the front-rear direction thereof is aligned with the Z1-Z2 direction as illustrated in FIGS. 1 to 3, whereby the Z1 direction is the frontward direction and the Z2 direction is the rearward direction. The speaker 1 may produce sound in the Z1 direction or may produce sound in the Z2 direction. FIG. 1 illustrates a center axis O that extends in the front-rear direction (in the Z1-Z2 direction). A major part of the speaker 1 is structured substantially in rotation symmetry with respect to the center axis O. As illustrated in FIG. 1, the X-axis and the Y-axis orthogonally intersect each other on a plane that orthogonally intersects the center axis O. Accordingly, the X-Y plane orthogonally intersects the center axis O.

Figure 4:
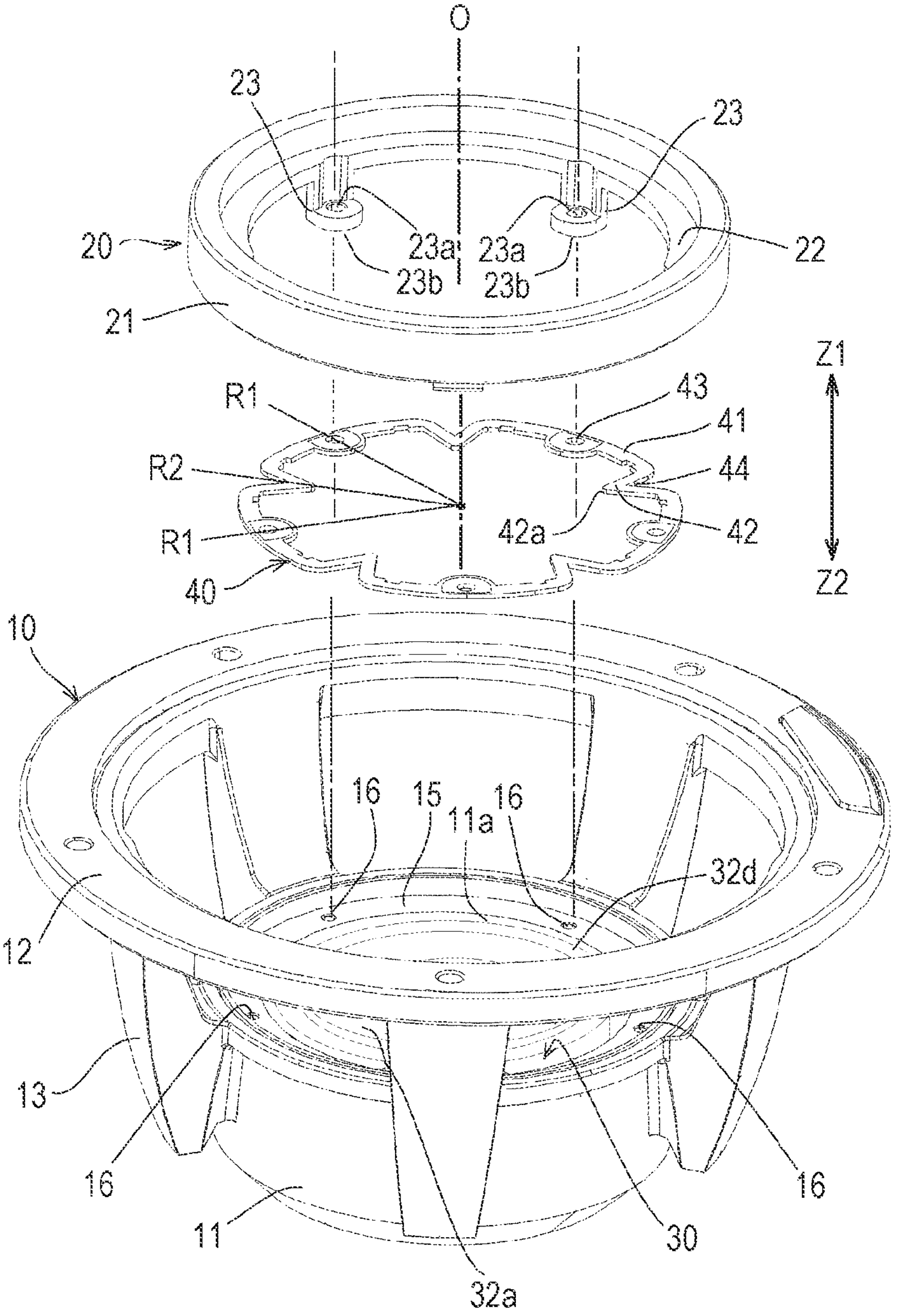
FIG. 4 is an exploded perspective view illustrating a frame, a magnetic circuit, a damper support member, and a pressing portion that are included in the speaker of the first embodiment.

As illustrated in FIG. 1 and FIG. 4, a frame 10 and a damper support member 20 constitute the support structure of the speaker 1. The frame 10 and the damper support member 20 are made of a magnetic metal or a non-magnetic metal or alternatively made of a synthetic resin. As illustrated in FIG. 4, the frame 10 is integrally formed of a magnetic circuit holder 11, a diaphragm support 12, and connection ribs 13. The magnetic circuit holder 11 is positioned at a rear side (a side in the Z2 direction) of the frame 10, and the diaphragm support 12 is positioned at a front side (a side in the Z1 direction) thereof. The connection ribs 13 connect the magnetic circuit holder 11 and the diaphragm support 12 to each other. The speaker 1 of the embodiment is of an in-car use type, and as illustrated in FIG. 1, the outside surface of the magnetic circuit holder 11 of the frame 10 is covered with an outer casing (exterior casing) 3.

The magnetic circuit holder 11 of the frame 10 has a holder recess 11*a* that is recessed rearward (in the Z2 direction). A magnetic circuit 30 is inserted rearward into the holder recess 11*a* and is held in this state. As illustrated in FIG. 1, the magnetic circuit 30 has an outer structure that is positioned outside a bobbin 53 and an inner structure that is positioned inside the bobbin 53. The outer structure is formed by layering a ring-like magnet 31, a ring-like outer front yoke 32*a*, and a ring-like outer rear yoke 33*a*. The outer front yoke 32*a* is joined to the front side of the magnet 31, and the outer rear yoke 33*a* is joined to the rear side of the magnet 31. The inner structure of the magnetic circuit 30 is formed by layering an inner front yoke 32*b* positioned in the front and an inner rear yoke 33*b* positioned in the rear. The yokes 32*a*, 32*b*, 33*a*, and 33*b* are made of a magnetic metal.

In the magnetic circuit 30, a front magnetic gap G1 is formed between the inner peripheral surface of the outer front yoke 32*a* and the outer peripheral surface of the inner front yoke 32*b*. The inner peripheral surface and the outer peripheral surface oppose each other. Similarly, a rear magnetic gap G2 is formed between the inner peripheral surface of the outer rear yoke 33*a* and the outer peripheral surface of the inner rear yoke 33*b*.

As illustrated in FIG. 1, the speaker 1 has a phase plug 4 disposed in a central region thereof. The phase plug 4 is made of a light metal or a synthetic resin, and the outer surface of the phase plug 4 is tapered such that the diameter of the phase plug 4 gradually decreases as it goes frontward (in the Z1 direction). The phase plug 4 has a flat rear end surface 4*a* that faces rearward (in the Z2 direction). A threaded hole 4*b* is bored frontward at the center of the rear end surface 4*a*. A front end surface 32*c* of the inner front yoke 32*b* of the magnetic circuit 30 is also a flat surface. The rear end surface 4*a* of the phase plug 4 lies on the front end surface 32*c* of the inner front yoke 32*b*.

A fixation hole is formed in a rear end portion 14 of the frame 10. The inner rear yoke 33*b* and the inner front yoke 32*b*, which form the inner structure of the magnetic circuit 30, are inserted rearward into the holder recess 11*a* of the magnetic circuit holder 11. The shaft of a fixation screw 5, which is inserted into the fixation hole of the rear end portion 14 from behind, is further inserted through the center holes of the inner rear yoke 33*b* and the inner front yoke 32*b*. Subsequently, a male thread portion formed at the end of the shaft of the fixation screw 5 is screwed into the threaded hole 4*b* formed in the phase plug 4. The inner rear yoke 33*b*, the inner front yoke 32*b*, and the phase plug 4 are positioned appropriately and fixed firmly together due to the screw engagement between the phase plug 4 and the fixation screw 5 inserted along the center axis O.

The magnet 31, the outer front yoke 32*a*, and the outer rear yoke 33*a* are positioned with center-to-center alignment in the outer structure of the magnetic circuit 30. The magnet 31 magnetically attracts the outer front yoke 32*a* and the outer rear yoke 33*a* so as to fix them together. The magnet 31, the outer front yoke 32*a*, and the outer rear yoke 33*a* are further adhered to each other using an adhesive. The outer structure is inserted rearward into the holder recess 11*a* of the magnetic circuit holder 11. Subsequently, a rear end surface 33*c* of the outer rear yoke 33*a*, in other words, the rear end surface of the outer structure, is adhered, using an adhesive, to the front surface of the rear end portion 14 of the frame 10. In the process of mounting the magnetic circuit

30, the magnetic circuit 30 is fixed, using a tool, such that both centers of the inner structure and the outer structure of the magnetic circuit 30 are aligned with the center axis O.

As illustrated in FIGS. 1 to 4, the ring-like body 21 of the damper support member 20 has a damper fixation surface 22 formed at the inner peripheral surface thereof. The damper fixation surface 22 is recessed rearward (in the Z2 direction). The damper fixation surface 22 is a flat surface positioned parallel to the X-Y plane. The ring-like body 21 has fixation legs 23, which are integrally formed with the ring-like body 21 so as to protrude rearward (in the Z2 direction) from the ring-like body 21. Five fixation legs 23 are arranged circumferentially with equiangular spacing. Fixation holes 23*a* are formed at respective fixation legs 23.

As illustrated in FIGS. 1 to 4, a mounting surface 15 is formed in the magnetic circuit holder 11 of the frame 10 so as to surround the opening of the holder recess 11*a*. The mounting surface 15, which extends parallel to the X-Y plane, is formed in a ring-like region in the magnetic circuit holder 11 with the center axis O being at the center. Threaded holes 16 are formed at the mounting surface 15. Five threaded holes 16 are arranged equiangularly with the center axis O being at the center.

The speaker 1 illustrated in FIGS. 1 to 4 has a pressing portion 40. The pressing portion 40 is a pressing member formed separately from the frame 10 and from the damper support member 20. The pressing portion (pressing member) 40 is formed of an elastically deformable board, such as a metal board or a synthetic resin board. As illustrated in FIGS. 1 to 3, the pressing portion 40 is fixed between the mounting surface 15, which is the front end surface of the magnetic circuit holder 11, and rear surfaces 23*b* of respective fixation legs 23 of the damper support member 20.

As illustrated in FIG. 4, the pressing portion 40 has a ring-like body 41, pressing arms 42, and fixation holes 43 formed in the ring-like body 41. Five fixation holes 43 are formed equiangularly with the center axis O being at the center. Five pressing arms 42 are also formed equiangularly with the center axis O being at the center. The ring-like body 41 has such a diameter as to fit on the mounting surface 15 of the magnetic circuit holder 11. Fixation holes 43 are formed at positions corresponding to respective threaded holes 16 formed at the mounting surface 15.

Each pressing arm 42 is formed so as to protrude toward the center axis O from the ring-like body 41. The pressing arm 42 has a substantially triangular shape of which the width gradually becomes smaller toward a tip portion 42*a* of the pressing arm 42. Openings 44 are formed in the pressing portion 40. Each opening 44 is recessed into the pressing arm 42 from the outer periphery of the pressing portion 40. Provision of the opening 44 can reduces the effective width of each pressing arm 42. Note that the tapered (substantially triangular) pressing arm 42 may have a hole at the center and the hole may serve as the opening 44. The pressing arm 42, which has its shape tapered toward the tip portion 42*a* and has the opening 44 formed therein, is adjusted so as to exhibit a relatively small elastic modulus for bending deformation in the thickness direction. Note that the shape of the pressing arm 42 as viewed in plan is not limited to the triangular shape, but the pressing arm 42 may be shaped appropriately, for example, like the letter U.

As illustrated in FIG. 1 and FIG. 3, in the state of the pressing portion 40 being placed between the mounting surface 15 of the magnetic circuit holder 11 and the rear surfaces 23*b* of the fixation legs 23, five fixation screws 17 are inserted rearward through respective fixation holes 23*a* formed in the fixation legs 23 and through respective fixation holes 43 formed in the pressing portion 40, and subsequently screwed into respective threaded holes 16 formed at the mounting surface 15. The tightening force of the fixation screws 17 can fix the ring-like body 41 firmly to the mounting surface 15. The fixation holes 23*a*, the fixation holes 43, the fixation screws 17, and the threaded holes 16 constitute screw-fixation portions that fix the pressing portion 40 to the magnetic circuit holder 11.

As illustrated in FIGS. 1 and 2, the outer front yoke 32*a* of the magnetic circuit 30 has a ring-like restriction surface 32*d* formed so as to face frontward. The restriction surface 32*d* is the surface that restricts displacement of the outer structure of the magnetic circuit 30. The restriction surface 32*d* is positioned parallel to the X-Y plane that orthogonally intersects the center axis O. The pressing arms 42, which protrude toward the center axis O from the pressing portion 40 that is fixed to the mounting surface 15, are in contact with the restriction surface 32*d* of the magnetic circuit 30.

As illustrated in the section of FIG. 2, the restriction surface 32*d* is positioned slightly frontward (in the Z1 direction) relative to the mounting surface 15. Accordingly, a step is produced between the restriction surface 32*d* and the mounting surface 15. When the pressing arms 42 are brought into contact with the restriction surface 32*d*, the pressing arms 42 are bent frontward (in the Z1 direction). The pressing arms 42 thereby provide elastic forces that elastically press the outer structure of the magnetic circuit 30 rearward (in the Z2 direction). On the other hand, the restriction surface 32*d* and the mounting surface 15 may be at the same position in the front-rear direction, or the restriction surface 32*d* may be positioned rearward relative to the mounting surface 15. In such cases, the pressing arms 42 may be bent rearward in advance when in the free state so that the pressing arms 42 can elastically press the restriction surface 32*d* rearward.

As illustrated in FIG. 3, the ring-like body 41 of the pressing portion 40 is positioned radially away from the restriction surface 32*d* in the region where the pressing arms 42 are not present. The contact portions between the pressing arms 42 and the restriction surface 32*d* are positioned so as to have a space therebetween in the circumferential direction with the center axis O being at the center. In other words, the pressing portion 40 does not elastically press the entire circumferential portion of the restriction surface 32*d* but elastically press only parts thereof using the pressing arms 42. Multiple pressing arms 42 distribute the stress generated by the elastic pressure over the entire pressing portion 40, which prevents an excessive stress from acting on the entire pressing portion 40.

Each screw-fixation portion having the fixation hole 43 is positioned on a radial line R1 that extends from the center axis O, whereas each pressing arm 42 is positioned on a radial line R2 that extends from the center axis O. In other words, the screw-fixation portion and the pressing arm 42 are not positioned on the same radial line. As a result, the stress caused by elastic deformation of each pressing arm 42 does not readily act on the screw-fixation portion, which can reduce the likelihood that a large stress generated by elastic deformation of the pressing arms 42 acts on the frame 10. The radial line R2 divides the angular distance between circumferentially adjacent fixation holes 43 into halves, and the widthwise center of each pressing arm 42 is positioned on the radial line R2. Moreover, the pressing arms 42 and the screw-fixation portions are positioned equidistantly in the circumferential direction. Accordingly, the stress caused by the elastic deformation of the pressing arms 42 does not act concentratedly on a particular screw-fixation portion, which reduces the likelihood that the stress caused by deformation of the pressing arms 42 acts on the frame 10.

Moreover, in the speaker 1 of the first embodiment, the pressing portion 40 and the damper support member 20 to which the pressing portion 40 is fixed are formed separately from the frame 10, which reduces the likelihood that the stress caused by the elastic deformation of the pressing arms 42 directly acts on the frame 10.

As illustrated in FIG. 1, the speaker 1 has a diaphragm 51 disposed in a central region thereof. The diaphragm 51 is shaped like a cone. An elastically deformable edge member 52 is joined to a circumferential portion of the diaphragm 51 that faces frontward. The circumferential edge of the edge member 52 is further joined to a front end portion of the frame 10. A bobbin 53 is joined to a central portion of the diaphragm 51. Voice coils 54 are formed at two positions on a rear side of the bobbin 53. The voice coils 54 are formed by winding conducting wires around the cylindrically shaped bobbin 53. One of the voice coils 54 is disposed inside the front magnetic gap G1 of the magnetic circuit 30, and the other voice coil 54 is disposed in the rear magnetic gap G2. An inner peripheral portion of a damper 55 is joined to the outer peripheral surface of the bobbin 53. The damper 55 has a corrugate-shaped section. The outer peripheral portion of the damper 55 is joined to the damper fixation surface 22 of the damper support member 20.

In the speaker 1 illustrated in FIGS. 1 to 4, a driving current is applied to the two voice coils 54 in accordance with an audio signal output from an audio amplifier. A vibrating portion that includes the diaphragm 51 and the voice coils 54 vibrates in the front-rear direction due to the electromagnetic force generated by the driving current and the magnetic fluxes that traverse the voice coils 54 in the front magnetic gap G1 and the rear magnetic gap G2 of the magnetic circuit 30. The vibrating portion thereby generates sound pressures in accordance with the frequency of the driving current and produces sound frontward (in the Z1 direction) or rearward (in the Z2 direction).

As illustrated in FIG. 1, the inner structure of the magnetic circuit 30, which includes the inner front yoke 32*b* and the inner rear yoke 33*b*, is firmly fixed inside the magnetic circuit holder 11 of the frame 10 by the fixation screw 5 screwed into the phase plug 4. On the other hand, the outer structure in which the magnet 31, the outer front yoke 32*a*, and the outer rear yoke 33*a* are layered is adhered together inside the magnetic circuit holder 11. The outer structure may be displaced due to, for example, external vibrations. The speaker 1 of the embodiment, however, is configured such that the outer structure is elastically pressed rearward by the pressing arms 42 of the pressing portion 40 disposed at the magnetic circuit holder 11, as illustrated in FIG. 2, which can reduce the likelihood of the outer structure moving unexpectedly.

As illustrated in FIGS. 2 and 3, the contact portions between respective pressing arms 42 and the restriction surface 32*d* of the outer structure are arranged in the circumferential direction with spacing therebetween, which enables substantially only the pressing arms 42 to be deformed elastically and thereby prevents a large stress from acting on the frame 10. This reduces the likelihood of the frame 10 being bent or broken. Accordingly, this reduces the likelihood of the vibration characteristics of the diaphragm 51 deteriorating due to deformation of the frame 10.

Figure 5:
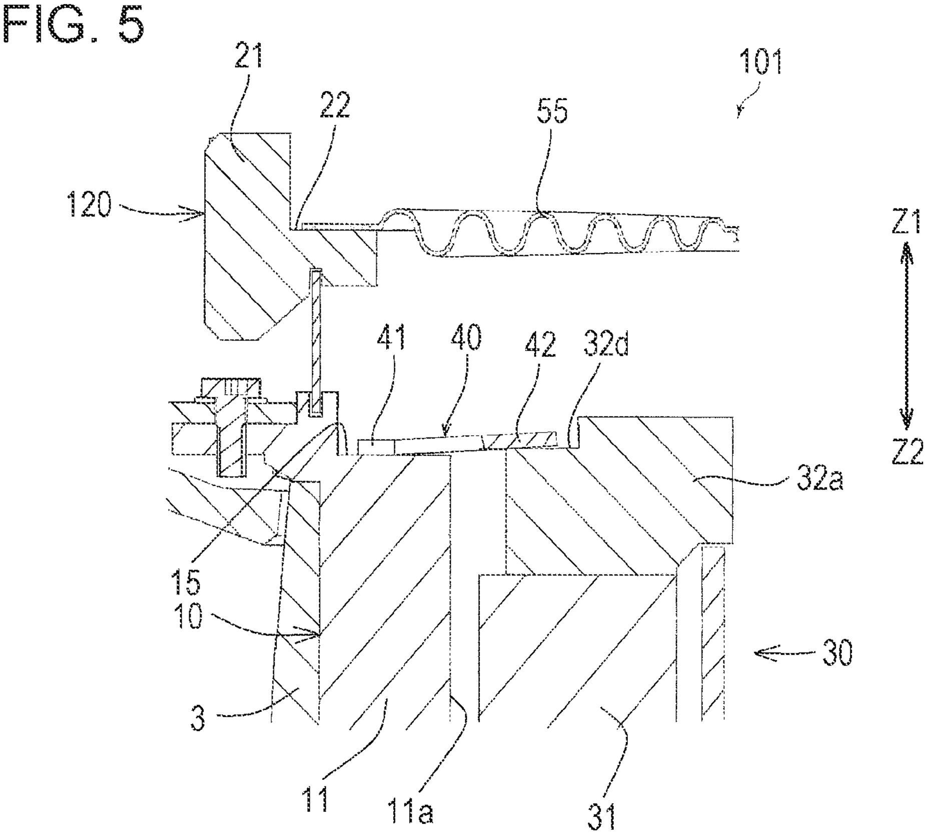
FIG. 5 is a sectional view illustrating part of a speaker according to a second embodiment of the present disclosure, the view corresponding to FIG. 2.
Figure 6:
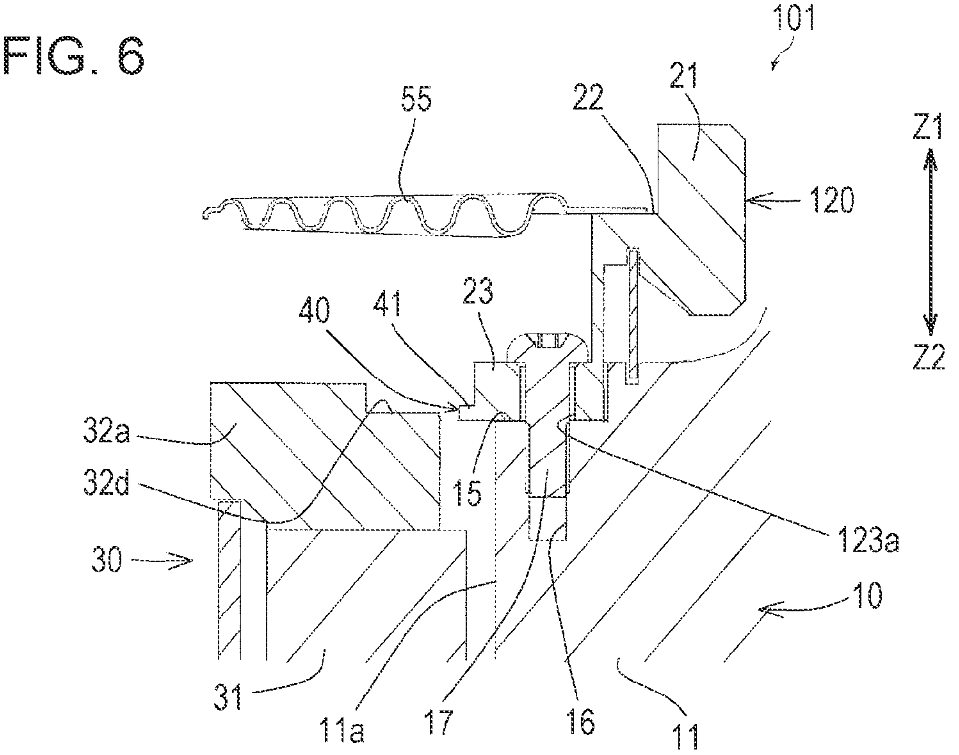
FIG. 6 is a sectional view illustrating part of the speaker according to the second embodiment of the present disclosure, the view corresponding to FIG. 3.
Figure 7:
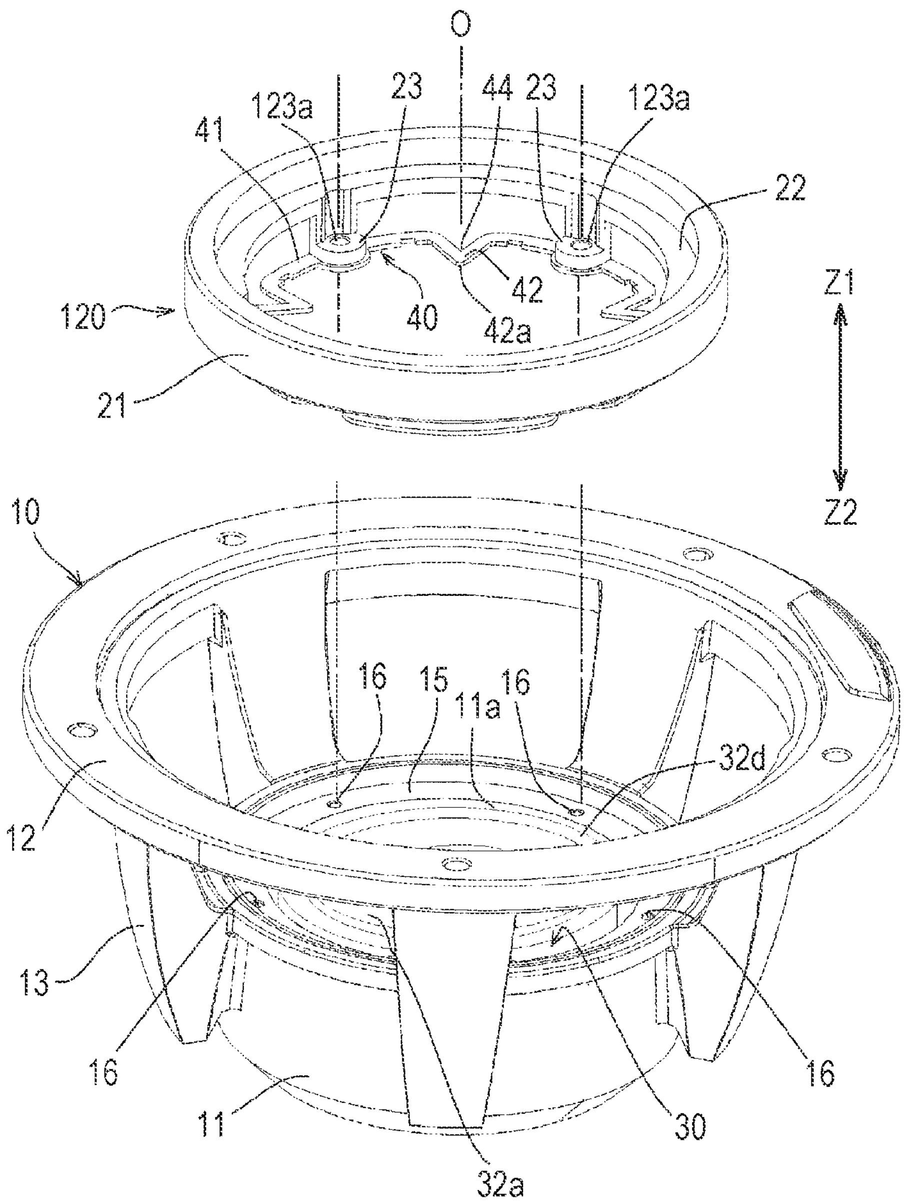
FIG. 7 is an exploded perspective view illustrating a frame, a magnetic circuit, a damper support member, and a pressing portion that are included in the speaker of the second embodiment.

FIGS. 5 to 7 illustrate a speaker 101 according to a second embodiment of the present disclosure. The speaker 101 includes the frame 10 and a damper support member 120. The damper support member 120 is made by integrally forming the damper support member 20 and the pressing portion 40 that are used for the speaker 1 of the first embodiment. The entire damper support member 120 is made integrally by injection molding using a synthetic resin or by die-casting using a metal. Alternatively, the damper support member 20 and the pressing portion 40 may be formed separately in advance and joined together using an adhesive or the like to form the damper support member 120.

As illustrated in FIGS. 6 and 7, the fixation legs 23 are integrated with the ring-like body 41 of the pressing portion 40 in the damper support member 120, and fixation holes 123*a* are formed through respective fixation legs 23 and through the ring-like body 41. As illustrated in FIG. 6, the damper support member 120 is fixed to the mounting surface 15 of the magnetic circuit holder 11 using the fixation screws 17, which are inserted into the fixation holes 123*a* and screwed into the threaded holes 16. The fixation screws 17, the fixation holes 123*a*, and the threaded holes 16 constitute the screw-fixation portions. At least the pressing arms 42 in the pressing portion 40 are formed so as to be elastically deformable. As illustrated in FIG. 5, the pressing arms 42 elastically press the restriction surface 32*d*, which is the front end surface of the magnetic circuit 30, so as to prevent the outer structure of the magnetic circuit 30 from moving easily.

Figure 8:
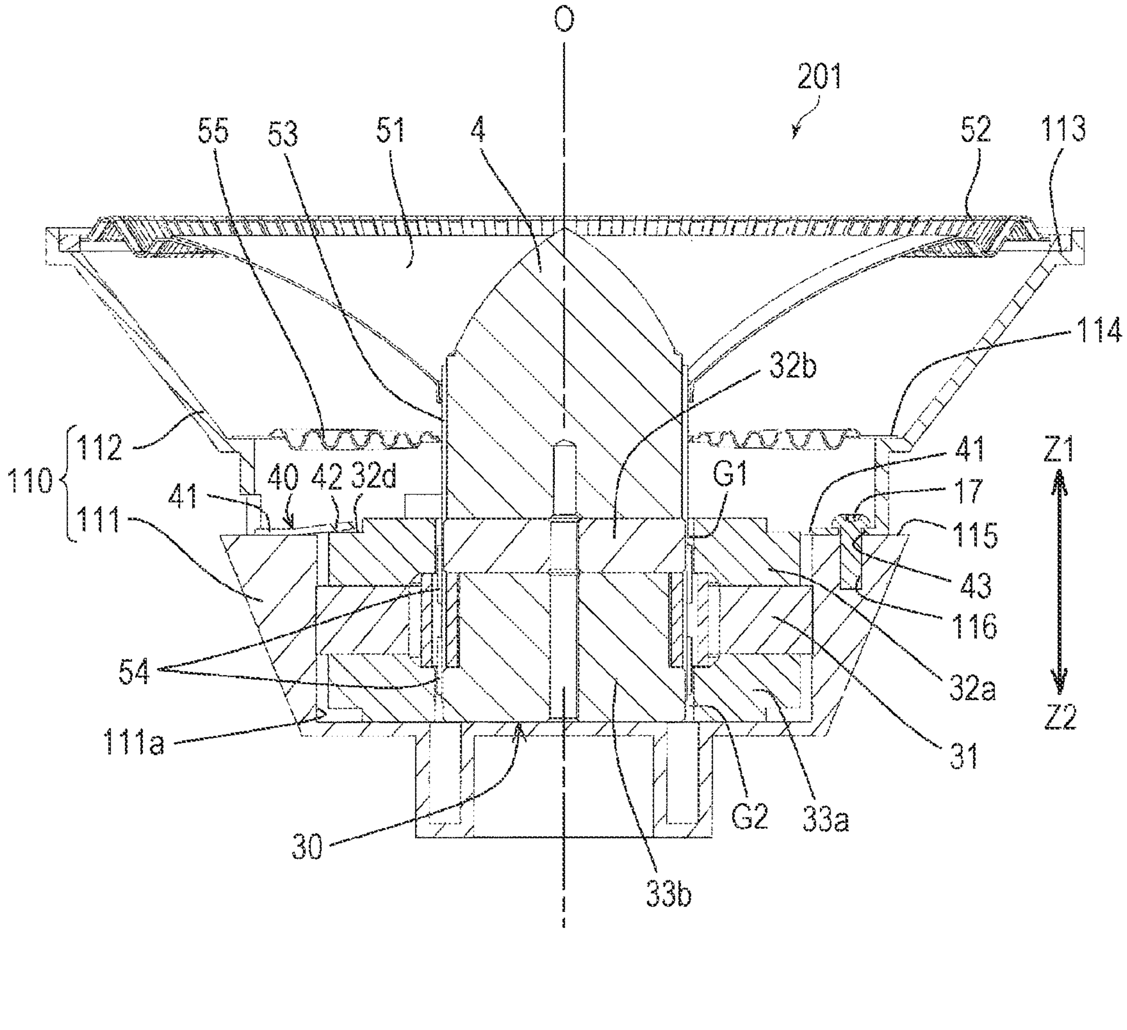
FIG. 8 is a sectional view illustrating a half section of a speaker according to a third embodiment of the present disclosure, the section being cut along the center axis of the speaker; and, FIG. 9 is a perspective view illustrating a pressing portion and a diaphragm support member that are included in the speaker of the third embodiment, the pressing portion and the diaphragm support member being formed integrally.

FIG. 8 illustrates a speaker 201 according to a third embodiment of the present disclosure. The speaker 201 is configured such that a frame 110 can be divided into a magnetic circuit holder member 111 and a diaphragm support member 112. The frame 110, however, may be formed of three or more components. The magnetic circuit holder member 111 serves as the magnetic circuit holder. The magnetic circuit 30 is held inside a holder recess 111*a* formed in the magnetic circuit holder member 111. In the magnetic circuit 30, the inner structure is formed of the inner front yoke 32*b* and the inner rear yoke 33*b*. As is the case for the speaker 1 of the first embodiment illustrated in FIG. 1, the inner structure and the phase plug 4 are fixed to the holder recess 111*a* by the fixation screw 5. Note that the fixation screw 5 is omitted in FIG. 8. The outer structure of the magnetic circuit 30 is formed of the magnet 31, the outer front yoke 32*a*, and the outer rear yoke 33*a*. In the outer structure, the rear end surface 33*c* of the outer rear yoke 33*a* is adhered to the bottom of the holder recess 111*a*. The front magnetic gap G1 and the rear magnetic gap G2 are formed between the inner structure and the outer structure.

Figure 9:
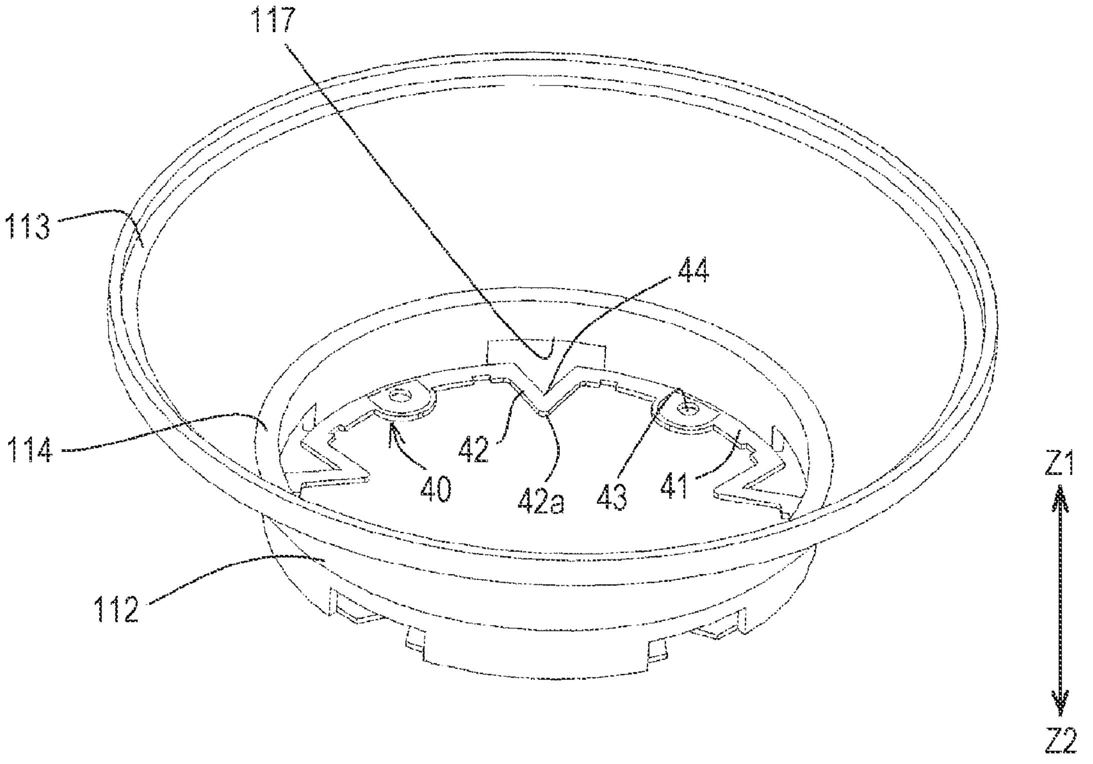

As illustrated in FIG. 9, the diaphragm support member 112 of the frame 110 has the pressing portion 40 formed integrally with the diaphragm support member 112 in a rear end portion thereof. The entire diaphragm support member 112 is made integrally by injection molding using a synthetic resin or by die-casting or press forming using a metal. The pressing portion 40 has the ring-like body 41, the fixation holes 43 formed in the ring-like body 41, and the pressing arms 42 protruding toward the center from the ring-like body 41. As illustrated in FIG. 8, the magnetic circuit holder member 111 has a mounting surface 115 that faces frontward (in the Z1 direction). Threaded holes 116 are formed at the mounting surface 115. As illustrated in FIG. 8, the ring-like body 41 is fixed to the mounting surface 115 of the magnetic circuit holder member 111 using the fixation screws 17, which are inserted through the fixation holes 43 and screwed into the threaded holes 116. The fixation holes 43, the threaded holes 116, and the fixation screws 17 constitute the screw-fixation portions. The screw-fixation portions fix the magnetic circuit holder member 111 and the diaphragm support member 112 to each other.

At least the pressing arms 42 in the diaphragm support member 112 are formed so as to be elastically deformable. As illustrated in FIG. 8, the pressing arms 42 protrude toward the center axis O from the mounting surface 115. The pressing arms 42 press the restriction surface 32*d*, which is the front end surface of the outer structure of the magnetic circuit 30.

As illustrated in FIG. 9, an edge member fixation surface 113 is formed at the outer peripheral portion of the front end of the diaphragm support member 112. A damper fixation surface 114 is formed at the inner peripheral portion of the diaphragm support member 112 at a rear side thereof. The edge member 52 is joined to the circumferential portion of the diaphragm 51, and the circumferential edge of the edge member 52 is joined to the edge member fixation surface 113. The bobbin 53 is joined to the central portion of the diaphragm 51, and the voice coils 54 are formed at two positions on a rear side of the bobbin 53. The voice coils 54 are positioned inside the respective front magnetic gap G1 and rear magnetic gap G2. The damper 55 is joined to the outer peripheral surface of the bobbin 53, and the outer peripheral portion of the damper 55 is joined to a damper fixation surface 114.

According to the speaker 201 of the third embodiment, the pressing portion 40 is formed integrally with the diaphragm support member 112. Accordingly, the pressing portion 40 can be positioned and fixed accurately due to the screw-fixation portions fixing the magnetic circuit holder member 111 and the diaphragm support member 112 together, which eliminates the necessity of positioning the pressing portion 40 separately with respect to the magnetic circuit holder member 111 and to the diaphragm support member 112. The diaphragm support member 112 is structured such that each pressing arm 42 is positioned away from the diaphragm support member 112 with a space 117 provided therebetween, and accordingly the pressing arm 42 can elastically deform independently. In other words, the diaphragm support member 112 is structured such that when the pressing arms 42 that press the outer structure of the magnetic circuit 30 deform elastically, the stress is not easily transferred to the diaphragm support member 112. This enables the outer structure of the magnetic circuit 30 to be held stably inside the holder recess 111*a* of the magnetic circuit holder member 111. In addition, this can prevent an excess stress from acting on the diaphragm support member 112.

Note that in the speaker 201 of the third embodiment illustrated in FIGS. 8 and 9, the pressing portion 40 may be formed separately from the diaphragm support member 112, and the ring-like body 41 of the pressing portion 40 may be fixed between the magnetic circuit holder member 111 and the diaphragm support member 112.

Although there has been illustrated and described what is at present contemplated to be preferred embodiments of the present disclosure, it will be understood by those skilled in the art that various changes and modifications may be made, and equivalents may be substituted for elements thereof without departing from the true scope of the disclosure. In addition, many modifications may be made to adapt a particular situation to the teachings of the disclosure without departing from the central scope thereof. Therefore, it is intended that this disclosure not be limited to the particular embodiments disclosed, but that the disclosure will include all embodiments falling within the scope of the appended claims.

What is claimed is:

1. A speaker comprising:
a frame;
a diaphragm supported by the frame so as to enable the diaphragm to vibrate;
a coil that drives the diaphragm to vibrate; and
a magnetic circuit that is positioned rearward relative to the diaphragm and applies a magnetic field to the coil, wherein:
the frame has a magnetic circuit holder in which the magnetic circuit is held,
the magnetic circuit holder has a mounting surface that faces frontward,
the magnetic circuit has a restriction surface that faces frontward,
the magnetic circuit holder has pressing arms that are elastically deformable and that are disposed so as to be in contact with the restriction surface,
contact portions between respective pressing arms and the restriction surface are disposed with spacing between each other;
a pressing portion has a fixation portion that is fixed to the mounting surface, and
the pressing arms and the fixation portion are disposed such that a radial line that extends from a center of the magnetic circuit and on which the fixation portion of the pressing portion is positioned does not overlap radial lines that extend from the center of the magnetic circuit and on which respective pressing arms are positioned.

2. The speaker according to claim 1, wherein:
the magnetic circuit holder is configured such that the magnetic circuit is inserted rearward into the magnetic circuit holder and is fixed in the magnetic circuit holder.

3. The speaker according to claim 1, wherein:
the pressing arms are integrally formed with the pressing portion.

4. The speaker according to claim 1, wherein:
the restriction surface is positioned frontward relative to the mounting surface, and
a step is produced between the restriction surface and the mounting surface.

5. The speaker according to claim 1, wherein:
the pressing portion is formed separately from the frame.

6. The speaker according to claim 1, wherein:
the pressing portion is formed integrally with the frame.

7. The speaker according to claim 5, wherein:
a damper support member to which an outer peripheral portion of a damper that supports the diaphragm is fixed is formed separately from the frame, and
the pressing portion is interposed between the mounting surface and the damper support member.

8. The speaker according to claim 5, wherein:
a damper support member to which an outer peripheral portion of a damper that supports the diaphragm is fixed is formed separately from the frame, and
the pressing portion is formed integrally with the damper support member.

9. The speaker according to claim 6, wherein:
the frame has a diaphragm support member that supports the diaphragm and a magnetic circuit holder member that holds the magnetic circuit, and
the pressing portion is formed integrally with the diaphragm support member.

10. The speaker according to claim 5, wherein:
the frame has a diaphragm support member that supports the diaphragm and a magnetic circuit holder member that holds the magnetic circuit, and the pressing portion is interposed between the mounting surface and the diaphragm support member.

11. A speaker comprising:

a frame;

a diaphragm supported by the frame so as to enable the diaphragm to vibrate;

a coil that drives the diaphragm to vibrate; and a magnetic circuit that is positioned rearward relative to the diaphragm and applies a magnetic field to the coil, wherein:

the frame has a magnetic circuit holder in which the magnetic circuit is held, the magnetic circuit has a restriction surface that faces frontward, the magnetic circuit holder has a mounting surface that faces frontward, a pressing portion has a screw-fixation portion that is screw-fixed to the mounting surface, the pressing portion being integrally formed with pressing arms that are elastically deformable and that are disposed so as to be in contact with the restriction surface, contact portions between respective pressing arms and the restriction surface are disposed with spacing between each other, and the pressing arms and the screw-fixation portion are disposed such that a radial line that extends from a center of the magnetic circuit and on which the screw-fixation portion of the pressing portion is positioned does not overlap radial lines that extend from the center of the magnetic circuit and on which respective pressing arms are positioned.

12. The speaker according to claim 11, wherein:

the magnetic circuit holder is configured such that the magnetic circuit is inserted rearward into the magnetic circuit holder and is fixed in the magnetic circuit holder.

13. The speaker according to claim 11, wherein:

the restriction surface is positioned frontward relative to the mounting surface, and a step is produced between the restriction surface and the mounting surface.

14. The speaker according to claim 11, wherein:

the pressing portion is formed separately from the frame.

15. The speaker according to claim 11, wherein:

the pressing portion is formed integrally with the frame.

16. The speaker according to claim 14, wherein:

a damper support member to which an outer peripheral portion of a damper that supports the diaphragm is fixed is formed separately from the frame, and the pressing portion is interposed between the mounting surface and the damper support member.

17. The speaker according to claim 14, wherein:

a damper support member to which an outer peripheral portion of a damper that supports the diaphragm is fixed is formed separately from the frame, and the pressing portion is formed integrally with the damper support member.

18. The speaker according to claim 15, wherein:

the frame has a diaphragm support member that supports the diaphragm and a magnetic circuit holder member that holds the magnetic circuit, and the pressing portion is formed integrally with the diaphragm support member.

19. The speaker according to claim 14, wherein:

the frame has a diaphragm support member that supports the diaphragm and a magnetic circuit holder member that holds the magnetic circuit, and the pressing portion is interposed between the mounting surface and the diaphragm support member.

* * * * *